Figure 1:
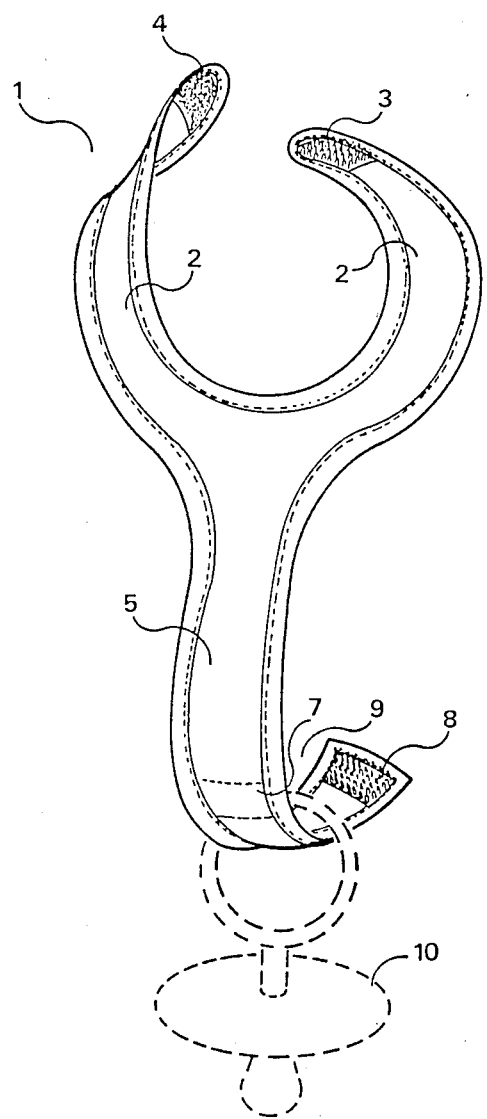

United States Patent [19]

Winger

[11] Patent Number: 4,700,408
[45] Date of Patent: Oct. 20, 1987

[54] PACIFIER HOLDER FOR INFANTS

[76] Inventor: Patricia A. Winger, 8 Stanson Close, Kitchener, Ontario, Canada, N2G 3W6

[21] Appl. No.: 46,001

[22] Filed: May 4, 1987

[30] Foreign Application Priority Data

May 30, 1986 [CA] Canada .................................. 510530

[51] Int. Cl.⁴ ............................................. A41B 13/10
[52] U.S. Cl. .................................................... 2/49 R
[58] Field of Search ......................... 2/49 R; 128/359; D24/45

[56] References Cited

U.S. PATENT DOCUMENTS 4,564,957 1/1986 Schart .................................... 2/49 R
4,604,758 8/1986 Grasberger et al. .................. 2/49 R Primary Examiner—Doris L. Troutman
Attorney, Agent, or Firm—R. Craig Armstrong

[57] ABSTRACT

A pacifier holder is disclosed, substantially in the shape of a "Y". The upper arms of the Y-shape have VELCRO (TM) hook and pile sections or other suitable fasteners at their distal ends to permit them to be attached to each other behind the infant's neck to position the holder around the infant's neck with the base leg of the Y-shape hanging in front of the infant, on his or her chest. The base leg is provided with VELCRO hook and pile sections or other suitable fasteners near its distal end so that a loop may be formed to engage the ring which typically is provided as part of a pacifier.

4 Claims, 1 Drawing Figure

PACIFIER HOLDER FOR INFANTS

This invention relates to a holder for an infant pacifier, soother, teething ring or the like, intended for attachment around the infant's neck.

As parents of young children well know, pacifiers are regularly dropped by infants, often under very inconvenient circumstances. The pacifier may, for example, be dropped in a public place, automobile, public transportation vehicle or other locations where recovery may be difficult or impossible, and where the pacifier, if recovered, may have to be washed before further use, for obvious sanitary reasons.

There is therefore a need for a safe but simple device, by which the pacifier may be retained so that its use is not inhibited, but so that if the infant drops the pacifier it remains nearby.

Needless to say, a prime consideration in designing any such device must be safety, particularly with devices such as the one of the present invention where it is intended that the device be fastened around the infant's neck. The device must be designed in such a fashion that should the pacifier or should any part of the device itself become snagged, it will readily release from the infant's neck.

It is an object of the invention to provide such a device, whereby a pacifier, soother, teething ring or the like may be retained.

In the invention, there is therefore provided a substantially V-shaped pacifier holder, the arms of the Y-shape constituting the attachment means which go around the infant's neck and fasten to each other, and the base of the Y-shape constituting a retaining strap for the pacifier. The end of the base leg is provided with VELCRO (trademark) hook and pile fastening, or other suitable fastening means, so that a loop may be formed in the leg material to engage the ring which typically is provided as part of a pacifier.

The invention will now be described in greater detail, with reference to the accompanying drawing, which is a perspective of the pacifier holder.

The pacifier holder 1 is sewn or otherwise assembled from any suitable flexible material, such as terry cloth, cotton, polyester/cotton, or the like, with or without a plastic backing. The pacifier holder is substantially Y-shaped with the upper arms 2 of the Y constituting the means for attaching the holder around the infant's neck. Fastening means such as VELCRO hook and pile sections 3 and 4 respectively permit the distal ends of the upper arms 2 to be attached to each other behind the infant's neck to position the holder around the infant's neck with the base leg 5 of the Y-shape hanging in front of the infant, on his or her chest. In lieu of VELCRO, it should be obvious to the reader that any other suitable fastening means, such as dome fasteners or clips could be used, subject always to the condition that the fastening means must be such that any strong force applied to the holder will cause the fastening means to release, for the obvious safety reasons mentioned above.

The base leg of the Y-shape is a strap 5 which hangs down in front of the infant when the holder is attached to the infant's neck. One side of the strap 5 is provided with VELCRO pile and hook tabs 7 and 8 respectively, spaced apart slightly so that the strap 5 may be bent back onto itself to mate the VELCRO tabs, thereby forming a loop 9 in the strap. The loop 9 can be used to hold a pacifier, soother, teething ring or the like, as illustrated by the ghosted pacifier 10 in the drawing.

As with the fastening means at the distal ends of the upper arms, it should be obvious to the reader that any suitable means other than VELCRO could also be used satisfactorily.

For aesthetic reasons, the VELCRO hook and pile tabs are preferably provided on the rear of the strap 5, so that the distal end of the strap loops back onto the back of the strap, rather than onto the front. From a functional viewpoint, however, the tabs could just as easily be on the front surface of the strap, and therefore such an arrangement is considered to be clearly part of the present invention.

As with bibs or other such devices, of course the upper arms 2 of the Y-shape should not be too long, so that the fit of the holder is not overly loose around the infant's neck, for safety reasons. Similarly, the strap 5 should not be too long, so that the likelihood of it snagging or tangling with something is minimized. In the versions being prepared by the inventor for marketing, the overall length of the strap 5, measured from the margin closest to the infant's neck down to the end of the strap, is approximately seven inches. With the loop 9 formed, the dimension down to the bottom of the loop is approximately five inches. These have been found to be suitable dimensions, although obviously the dimensions could be varied somewhat. However, if overly shortened, then of course the infant would not have access to the pacifier because the strap would be too taut. On the other hand if the strap was too long, not only would this be unnecessary and therefore wasteful of material, but also the pacifier might be too free to contact the floor or other unsanitary spots, or too free to tangle in, for example, carriage wheels.

For comfort, the upper arms 2 of the Y-shape are preferably up to one and one half inches in width, as is the width of the strap 5. Obviously, the upper arms 2 need not have this width, and could for example be made in the manner of conventional bib strings. Similarly, the strap portion need not have the suggested width, although it is convenient to have some width at the loop 9 so that the strap is not overly loose in the ring of the pacifier 10.

It will be appreciated that there are a number of obvious variations on the invention as described above. For example, it should be appreciated that the actual choice of materials is generally not relevant to the invention, although materials which are relatively inflexible should be avoided for obvious reasons. Obvious variations on the invention as described above are considered to be within the scope of the invention as claimed, whether or not expressly described above.

The embodiments of the invention in which an exclusive property or privilege is claimed are defined as follows:

1. A holder for a pacifier or the like, substantially Y-shaped, the upper arms of the Y-shape constituting attachment means for fastening the holder around an infant's neck, the distal ends of said upper arms being provided with fastening means for fastening each to the other, and the base leg of the Y-shape constituting a retaining strap for the pacifier or the like, fastening means near the distal end of said retaining strap being provided whereby said distal end may be formed back onto itself to form a loop for engaging the ring of the pacifier or the like.

2. A holder as recited in claim 1, in which said fastening means near the distal end of said retaining strap comprises respective hook and pile fastener tabs spaced apart on one side of said retaining strap.

3. A holder as recited in claim 1, in which said fastening means near the distal end of said retaining strap comprises respective hook and pile fastener tabs spaced apart on one side of said retaining strap, and in which said fastening means on the distal ends of said upper arms comprises hook and pile fastener means, a hook tab being positioned at the distal end of one of said upper arms, and a pile tab at the distal end of the other of said upper arms.

4. A holder as recited in either of claims 1, 2 or 3, in which the length of said retaining strap, measured from the upper margin of the central junction of the Y-shape to the end of said loop when said loop is formed is roughly five inches.

\* \* \* \* \*